No. 634,626. Patented Oct. 10, 1899.
A. J. PARK.
FISH GLOBE OR TANK.
(Application filed July 7, 1898.)
(No Model.)
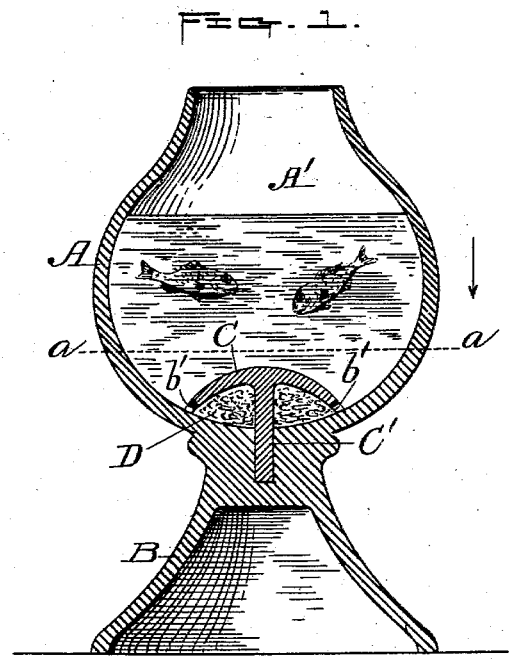
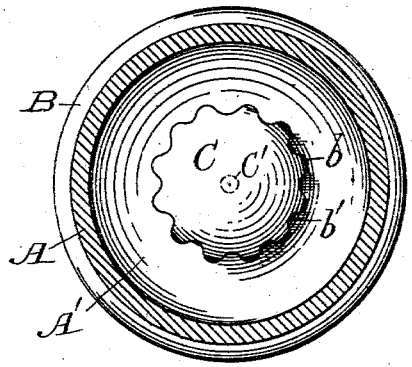
Witnesses:
C. F. Wesson
A. A. Gilbert
Inventor:
Albert J. Park
By H. A. Barker, Atty.

UNITED STATES PATENT OFFICE.

ALBERT J. PARK, OF WORCESTER, MASSACHUSETTS.

FISH GLOBE OR TANK.

SPECIFICATION forming part of Letters Patent No. 634,626, dated October 10, 1899.

Application filed July 7, 1898. Serial No. 685,356. (No model.)

*To all whom it may concern:*

Be it known that I, ALBERT J. PARK, of the city and county of Worcester and State of Massachusetts, have invented certain new and useful Improvements in Fish Globes or Tanks; and I do hereby declare that the following is a full, clear, and exact description thereof, reference being had to the accompanying drawings, forming a part of this specification, in which—

Figure 1 represents a central vertical section through a fish-globe with my improvements applied thereto; and Fig. 2 is a horizontal section thereof, taken at the point indicated by line $a\ a$, Fig. 1, looking down and showing a plan of the bottom of the globe to which said improvement is applied.

My invention relates more particularly to glass fish-globes, although it may be applied, if desired, to tanks or other receptacles of various kinds and shapes for containing goldfish or other species of fish.

The object thereof is to provide means combined with the bottom of the globe for disposing of the fish deposit and other particles and impurities in the water, so as to keep the body of said water above the bottom clean and clear from such impurities.

Said invention consists in arranging near the bottom of said globe, tank, or other receptacle a horizontal partition to form a chamber underneath between the same and the bottom of the globe, having a central downward-extending support preferably fitting in an opening in the base of the globe, and also having openings, preferably at its edges next to the walls of said globe, for connecting the main chamber with said bottom auxiliary chamber, as will be hereinafter more fully set forth.

In order that others may better understand the nature and purpose of my said invention, I will now proceed to describe it more in detail with reference to the accompanying drawings.
In said drawings, A represents the body of the globe for holding the water and fishes. B is the base upon which it rests, which may be employed or not, according to the shape of the globe or other receptacle, and C is the horizontal partition before alluded to, arranged across the inside of the globe near the bottom thereof to form the refuse chamber or receptacle D underneath between the same and the bottom of the globe. Said partition may be formed in various ways and of different shapes, and I therefore do not limit myself to any special way of producing the same or to its special shape or size. It is preferably made separable from the globe and similar in shape to an ordinary mushroom or toadstool, with a central downwardly-projecting stem $C'$, which is preferably fitted in a vertical opening formed in the bottom of the globe to hold it in position, and with a scalloped edge $b$ to form openings $b'$ around the same next to the wall of the globe for connecting the upper or main globe-chamber $A'$ with the auxiliary refuse-chamber D. By thus providing the globe or other receptacle with an auxiliary chamber at the bottom, connected by openings, as aforesaid, with the upper main chamber, the fish deposits and other particles or impurities in the water settling to the bottom work down through the openings $b'$ and collect in said auxiliary chamber D, as is shown in Fig. 1. Said refuse matter after thus passing into the auxiliary chamber, being covered by the horizontal partition, is not liable to work up again into the upper main chamber, and consequently the water therein is always kept clean and clear. This I have fully demonstrated in actual practice.

The collection of refuse matter in globes or tanks and aquariums used for fishes has heretofore been a serious objection, owing to the same floating about when the water is in the least stirred by the fishes and producing not only an unsightly appearance, but also causing the water to be contaminated and soon rendering the same unfit for use, thus necessitating very frequent renewals in order to keep the fish in a healthy condition. This objection has undoubtedly deterred many from maintaining a fish-globe or aquarium who would otherwise do so. By the application of my invention thereto said objections are wholly removed. While of a simple and inexpensive nature, its usefulness will be attested to by those interested in maintaining such globes or aquariums.

Although said invention is designed mainly for use in ordinary fish-globes or house-aquariums, it is obvious that it may be applied upon a larger scale, if desired, to outdoor aquariums or fish-tanks, and I therefore do not limit myself to its use.

Having now described my invention, what I claim therein as new, and desire to secure by Letters Patent, is—

In a fish globe or tank, a horizontal partition, having a central, downward-extending support, said partition being arranged near the bottom of said tank or globe to form an auxiliary chamber underneath, and also provided with openings around its edge to form a connection between said auxiliary chamber and the main chamber, substantially as and for the purpose set forth.

ALBERT J. PARK.

Witnesses:
A. A. BARKER,
W. B. NOURSE.